United States Patent [19]
Pinto et al.

[11] Patent Number: 5,366,774
[45] Date of Patent: Nov. 22, 1994

[54] ANTINESTING PREFORMS FOR BLOW-MOLDED ARTICLES

[75] Inventors: Henry M. Pinto, Candler; John Bombace, Fletcher, both of N.C.; Paul La Barre, St. Adresse, France

[73] Assignee: Southeastern Container, Enka, N.C.

[21] Appl. No.: 21,731

[22] Filed: Feb. 23, 1993

Related U.S. Application Data

[63] Continuation of Ser. No. 583,214, Sep. 14, 1990, abandoned.

[51] Int. Cl.⁵ .............................................. B65D 1/00
[52] U.S. Cl. .............................. 428/36.92; 428/542.8; 215/1 C
[58] Field of Search ........................ 428/36.92, 542.8; 215/1 C

[56] References Cited

U.S. PATENT DOCUMENTS 4,649,068 3/1987 Collette ................ 428/542.8

*Primary Examiner*—Charles R. Nold
*Attorney, Agent, or Firm*—Varnum, Riddering, Schmidt & Howlett

[57] ABSTRACT

A tubular preform for a blow-molded container. The preform has a closed end and an opposite open end, the relative dimensions of the ends being such that the closed end would be receivable in the open end of a similar preform to nest there were it not for the provision of an antinesting feature in the form of a plurlity of axially extending ribs which protrude inwardly from the inner surface of the preform adjacent to the open end to prevent entry of another preform.

9 Claims, 2 Drawing Sheets

ANTINESTING PREFORMS FOR BLOW-MOLDED ARTICLES

This is a continuation of application Ser. No. 07/583,214, filed Sep. 14, 1990, now abandoned.

BACKGROUND OF THE INVENTION

This invention relates to preforms for blow-molded articles, and more particularly, to antinesting preforms for blow-molded synthetic resinous containers.

Food and beverage containers formed of PET (polyethylene terephthalate), and particularly PET bottles for carbonated or effervescent beverages, have become ubiquitous throughout the principal industrial countries of the world.

PET bottles are commonly formed by the reheat-stretch-and--blow procedure. Though this procedure is well known, it may be described briefly as follows.

Tubular preforms, closed at one end and open at the other, are injection-molded of a suitable grade or formulation of PET. The neck finish, that is, the finish at the open end, is formed in the injection mold in a configuration to receive a suitable closure when the resulting container is filled.

The preforms are removed from the injection mold and allowed to cool to ambient temperature, and are later introduced to a blow-molding system where they are first heated to a temperature within the glass-transition range of the material, then mechanically stretched in the longitudinal direction, and finally blow-molded to final container configuration and dimensions. The mechanical stretching and blow-molding impart biaxial molecular orientation to the material of the container body, thereby enhancing the tensile strength of the body wall while reducing its thickness.

A number of machines and systems for performing this procedure are well known and commercially available.

The finished containers take a great variety of sizes and configurations. The problem of designing a PET container for a particular purpose presents a bewildering variety of considerations, among them not only capacity and aesthetic appeal, but economy of material, and importantly, whether the container is to be filled with contents under pressure, as in the case of carbonated beverages, or under vacuum, as in the case of hot-filled products.

When container configuration has been determined, an appropriate preform must be designed. Because of the need to conserve material and yet ensure that the material will be so distributed in the finished container that it will exhibit adequate resistance to deformation and rupture under all conditions of expected use, preform design has become an exact science, and an exacting one.

In the case of certain PET bottles intended to package highly carbonated beverages subject to internal pressures of three to four atmospheres, a preform configuration has evolved in which the outer diameter of the closed end is smaller than the internal diameter of the open end, whereby one preform may, by way of its open end, receive the closed end of an adjacent preform. Simply stated, such preforms are subject to nesting with one another.

Nesting is an impediment to safe and efficient handling. Heretofore, it was necessary to detect and separate nested preforms before damage could occur to them or to the equipment in which they were being processed. In many cases, detection and separation depended exclusively upon the watchfulness and dexterity of a human operator.

SUMMARY OF THE INVENTION

To eliminate the problem of nesting, the present invention begins with a preform which in well-known manner comprises a generally tubular body formed of synthetic resinous material about a central axis. The body has inner and outer surfaces surrounding the axis, a first end open to the inner surface, and a second end opposite to the first end. A narrow body portion is adjacent to the second end, and a wide body portion is axially spaced from the second end. The outer surface of the narrow portion has radial dimensions slightly smaller than radial dimensions of the inner surface of the wide portion.

The antinesting feature comprises interference means formed on the inner surface at the wide portion to prevent the narrow portion of a similar preform from nesting within the wide portion.

The interference means preferably comprises at least one projection protruding radially inwardly from the inner surface at the wide portion, such as an axially extending rib.

In preferred embodiments, the interference means comprises, not one, but a plurality of inwardly protruding projections such as ribs spaced circumferentially about the inner surface, each of the projections protruding radially inwardly from the inner surface.

These and other features, advantages and objects of the invention will be apparent from the ensuing description taken in conjunction with the accompanying drawings.

THE DRAWINGS

THE ILLUSTRATED EMBODIMENT

Figure 1:
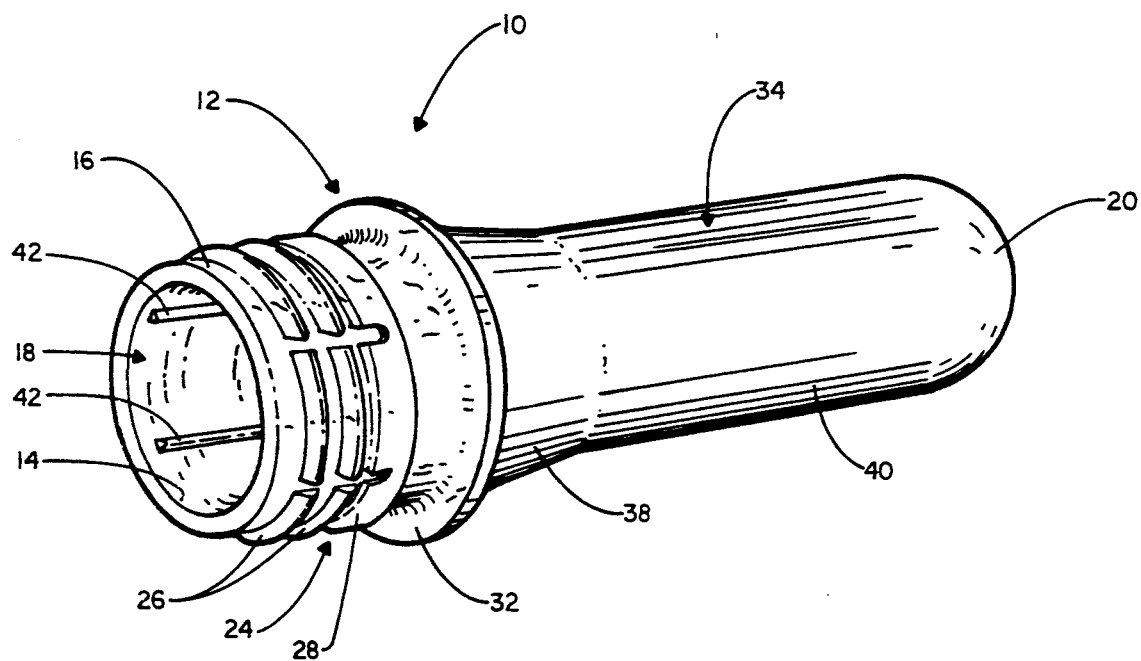
FIG. 1 is a perspective view of a preform constructed in accordance with the present invention and showing an open end of the preform.
Figure 2:
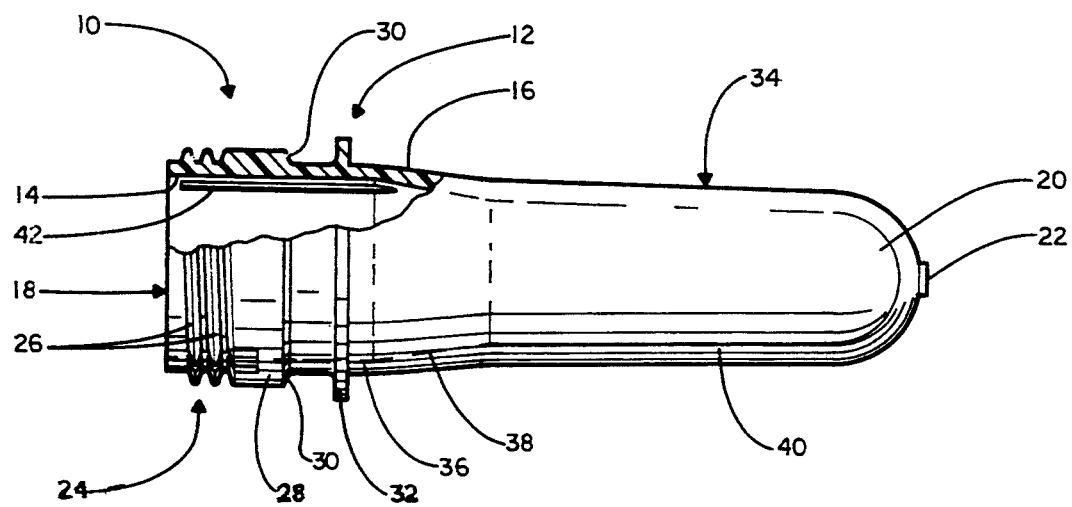
FIG. 2 is a side view of the preform of FIG. 1, a portion being broken away to reveal a section of the wall of the preform at the open end thereof.

Referring particularly to FIGS. 1 and 2, there is shown a preform 10 for a blow-molded article, in this instance a bottle (not shown) intended for the packaging of contents under pressure such as carbonated beverages. Preform 10 has preferably been injection-molded of PET and is ready to be reheated, stretched, and blow-molded into final container configuration by the procedure described hereinabove.

Preform 10 comprises a generally tubular body 12 formed about a central axis (not shown) and having an inner surface 14 and an outer surface 16 surrounding the axis.

A first end 18 of preform 10 is open to the inner surface. A second end 20, opposite to the first or open end, is closed in a generally hemispherical configuration and is shown bearing a hub 22 of excess material (FIG. 2) formed at the gate of the injection mold.

Provided adjacent to open end 18 is a neck finish generally represented at 24 and formed in its final or container configuration in the injection mold. The neck finish includes male threads 26 adapted to mate with female threads formed in a conventional closure (not shown) to be applied when the container blow-molded from preform 10 has been filled and the closure received over open end 18 of the preform. Neck finish 24 also includes a circumferential band 28 which provides a step 30 for retaining a breakaway tamper-indicating element (also not shown) of the closure on the container in well-known manner when the remainder of the closure is removed to provide access to the contents of the container.

A circumferential flange 32 is provided in this instance for use in handling the preform and the resulting container on processing and filling lines. Flange 32 is also useful to the consumer in pouring from the container, since it assists in affording a firm grip on the neck thereof. The configuration of neck finish 24 and flange 32, once established in the injection mold, are not altered in the blow-molding procedure, whereby they are carried over intact to the blown container.

The remainder of body 12 of the preform comprises a barrel 34 which extends from flange 32 in the opposite direction from neck finish 24. Barrel 34 comprises an annular portion 36 adjacent to flange 32, a frusto-conical portion 38 adjacent to the annular portion and opposite to flange 32, and a portion 40 which is tapered from the frusto-conical portion and terminates in the hemispherical closed end 20.

It will be noted that, among other things, the configuration of the barrel as just described affords ready removal of the preform from its cavity in the injection mold and ready separation from the injection-mold core. It is the barrel that is mechanically stretched in the axial direction after reheating of the preform and before the container is blow-molded from it.

Figure 3:
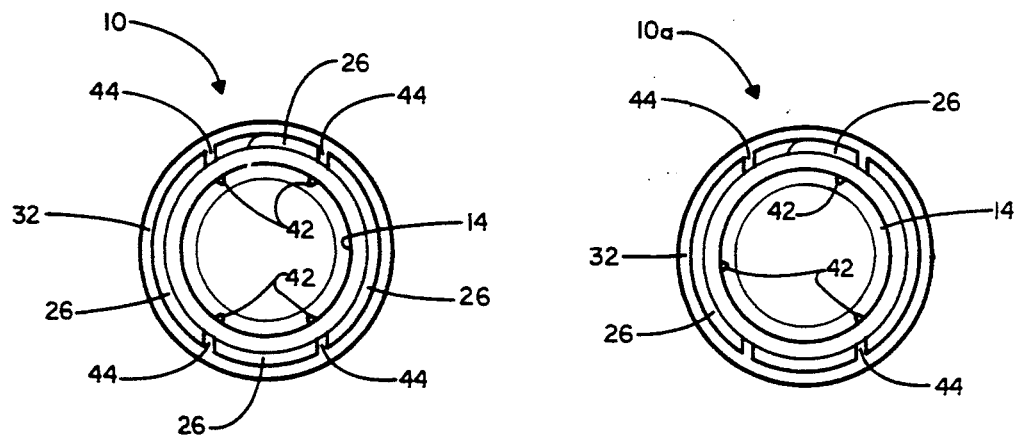
FIG. 3 is an end view of a pair of preforms from open ends thereof, both being constructed in accordance with the invention but having somewhat different internal features.
Figure 4:
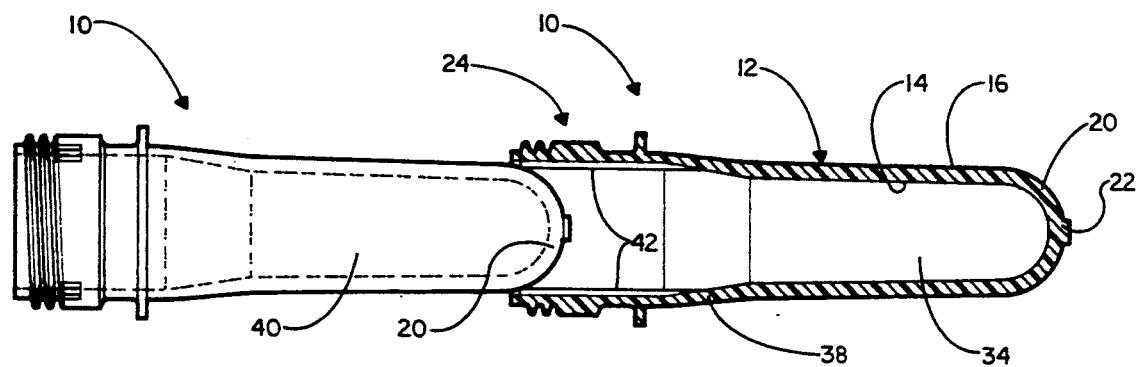
FIG. 4 is a view similar to FIG. 2, but showing a preform constructed in accordance with the invention in longitudinal section, and a similar preform adjacent thereto at the open end thereof.
Figure 5:
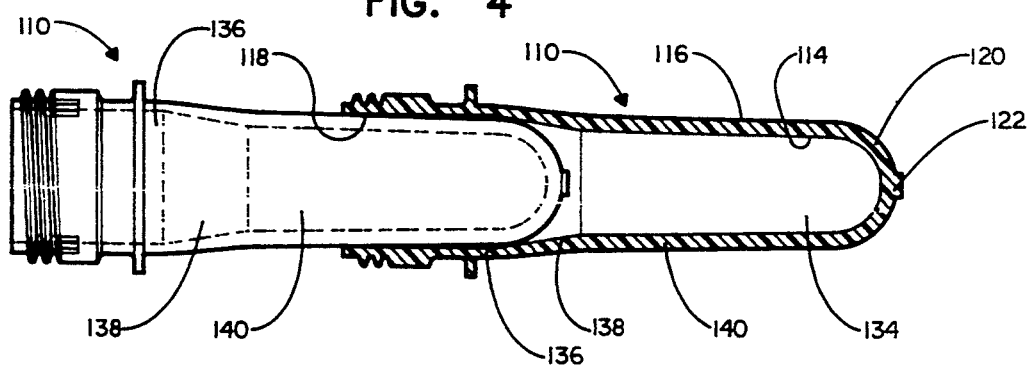
FIG. 5 is a view similar to FIG. 4, but representing prior art in that it shows a conventional preform with an adjacent preform, also conventional, nested within it.

Referring now to FIG. 5, in which reference numerals are one hundred greater than the reference numerals identifying corresponding features in FIGS. 1 to 4, there are shown a pair of conventional or prior-art preforms constructed substantially in the manner thus far described. Because the radial dimensions of outer surface 116 of each of the preforms 110 depicted in FIG. 5 are smaller at the closed end 120 (and at tapered portion 140) than the radial dimensions of the inner surface 114 at the open end 118, one preform is able to nest to a substantial degree within the other, as illustrated in FIG. 5.

Preforms according to the present invention, however, are provided with an antinesting feature in the form of interference means provided on inner surface 14 at the widest portion of body 12; that is, at open end 18. In the embodiment illustrated in FIGS. 1 and 2, the interference means takes the form of a plurality of projections or ribs 42 protruding radially inwardly from inner surface 14 and extending axially along the inner surface. Ribs 42 are substantially triangular in transverse section and intersect frusto-conical portion 38 of barrel 42, as best perceived in FIG. 4, features consonant with ready separation of preform 10 from the injection-molding core.

As is shown in FIG. 4, the interference means or ribs 42 act as obstacles to the insertion of another preform by way of open end 18.

Preform 10 of FIGS. 1 and 2 is also shown in end view at the left of FIG. 3. It will be seen to be provided with four ribs, whereas an alternative preform 10*a* shown at the right of FIG. 3 is provided with three ribs 42*a* circumferentially spaced at equal intervals of 120 degrees.

The four ribs 42 of preform 10 are not distributed at equal radial distances, their disposition being determined instead as follows.

Male threads 26 are interrupted to form axial vents 44, best illustrated in FIGS. 1 and 3. The vents permit internal pressure of a filled container to be relieved almost immediately as the consumer begins to rotate the closure to disengage its threads from male threads 26 of preform 10 in removing it from the container. Such vents are almost universally provided in PET containers intended for carbonated beverages to prevent blow-off of the closure which might result in personal injury. As will be noted in FIG. 3, these vents are provided in two pairs thereof, the pairs being spaced from each other at equal angular intervals, whereas the angular interval between the vents of either pair thereof is equal to the angular interval between the vents of the other pair. By spacing the four ribs 42 to coincide substantially with vents 44, the female elements of the injection mold which form the ribs act to compensate for the impediment to the flow of material caused by the male mold elements which form the vents 44.

Because ribs 44 are effective to decrease the radius of inner surface 14 only at narrow circumferential locations, they require much less additional material than would be needed if open end 18 were constricted through 360 degrees, and yet they provide a fully effective antinesting feature.

While the invention has been described in connection with certain specific embodiments thereof, it will be understood that this is by way of illustration and not of limitation and that the scope of the appended claims should be construed as broadly as the prior art will permit.

What is claimed is:

1. A preform for a blow-molded container, comprising a generally tubular body formed about a central axis and having inner and outer surfaces surrounding the axis, a first end open to the inner surface, a second end opposite to the first end, a wide portion of the tubular body adjacent the first end, a narrow portion of the tubular body axially spaced from the second end, the outer surface at the narrow portion having a radial dimension smaller than the radial dimension of the inner surface at the wide portion, wherein the improvement comprises at least one axially extending rib located along the inner surface at the wide portion and protruding radially inwardly from the inner surface of the wide portion a radial distance greater than the distance between the radial dimension of the outer surface of the narrow portion and the radial dimension of the inner surface of the wide portion to prevent a narrow portion of a similar preform from nesting within the wide portion.

2. A preform according to claim 1, wherein the rib is triangular in transverse section.

3. A preform according to claim 1, wherein the rib is spaced axially inwardly from an edge of the first end.

4. A preform for a blow-molded container, comprising a generally tubular body formed about a central axis and having inner and outer surfaces surrounding the axis, a first end open to the inner surface, a second end opposite to the first end, a wide portion of the tubular body adjacent the first end, a narrow portion of the body axially spaced from the second end, the outer surface at the narrow portion having a radial dimension smaller than the radial dimension of the inner surface at the wide portion, wherein the improvement comprises a plurality of axially extending ribs located along the inner surface at the wide portion and each rib protruding radially inwardly from the inner surface of the wide portion a distance so that the sum of the distances for the ribs is greater than the difference between the radial dimension of the outer surface of the narrow portion and the radial dimension of the inner surface of the wide portion to prevent a narrow portion of a similar preform from nesting within the wide portion.

5. A preform according claim 4, wherein each of the ribs is triangular in transverse section.

6. A preform according to claim 4, wherein each of the ribs is spaced inwardly from an edge of the open end.

7. A preform according to claim 4, wherein the ribs are spaced at equal intervals about the circumference of the inner surface.

8. A preform according to claim 4, wherein the ribs are three in number and are spaced at intervals of 120 degrees about the circumference of the inner surface.

9. A preform according to claim 4, including a neck finish comprising male threads extending outwardly from the outer surface adjacent to the first end, the threads being interrupted at predetermined circumferential locations to form a plurality of axially extending vents, the ribs being equal in number to the vents, each of the ribs being disposed at a circumferential location corresponding to the circumferential location of one of the vents.

* * * * *